(12) United States Patent  
Bergamo

(10) Patent No.: US 7,155,263 B1
(45) Date of Patent: Dec. 26, 2006

(54) BATTERY-CONSERVING TRANSMISSION AND ENCODING METHOD FOR WIRELESS AD HOC NETWORKS

(75) Inventor: Marcos A. Bergamo, Wellesley, MA (US)

(73) Assignee: BBN Technologies Corp., Cambridge, MA (US)

( * ) Notice: Subject to any disclaimer, the term of this patent is extended or adjusted under 35 U.S.C. 154(b) by 490 days.

(21) Appl. No.: 10/787,215

(22) Filed: Feb. 27, 2004

(51) Int. Cl.
  H04M 1/00 (2006.01)
  H04B 1/38 (2006.01)

(52) U.S. Cl. ............... 455/574; 455/343.5; 455/343.1; 455/522; 455/500

(58) Field of Classification Search ............... 455/574, 455/343.5, 343.1, 522, 500
  See application file for complete search history.

(56) References Cited

U.S. PATENT DOCUMENTS 5,790,946 A * 8/1998 Rotzoll ................... 455/343.1
6,104,708 A 8/2000 Bergamo ................. 370/320
6,473,607 B1 * 10/2002 Shohara et al. ........ 455/343.1
6,574,269 B1 6/2003 Bergamo ................. 375/142
6,590,889 B1 7/2003 Preuss et al. ............. 370/342

\* cited by examiner

*Primary Examiner*—Joseph Feild
*Assistant Examiner*—S. Smith
(74) *Attorney, Agent, or Firm*—Fish & Neave IP Group Ropes & Gray LLP

(57) ABSTRACT

A burst of data in a wireless network includes a preamble [502], a postamble [504] and one or more blocks of data [506]. A low or no power receiving device [102] receives the preamble [502]. When the preamble [502] includes an ID of the receiving device, structural information of the burst is derived from the preamble [502], indicating when at least one component of the device is to be powered on to receive the at least one block of data [506] included in the burst. The at least one component [306, 308, 310] is powered on at a first time period in order to receive the data in the one or more blocks of data. The at least one component [306, 308, 310] is powered off at a specific time period from a beginning of the first time period. The powering on and off are repeated for each of the one or more blocks of data [506] in the burst.

61 Claims, 7 Drawing Sheets

BATTERY-CONSERVING TRANSMISSION AND ENCODING METHOD FOR WIRELESS AD HOC NETWORKS

BACKGROUND OF THE INVENTION

1. Field of the Invention

The present invention relates generally to communication networks, and more specifically, to an apparatus and a method for communicating in a wireless network in a manner that conserves battery power.

2. Description of Related Art

Wireless networks having a number of battery-operated nodes distributed over a wide area are well known. In such networks, a receiver circuit in each node is either on at all times or is on at predefined time periods. When on, the receiver circuit may check for incoming messages. For example, in a Time Division Multiple Access (TDMA) network a receiver in a node may be on only during those time slots assigned to the node. In a second example, in Code Division Multiple Access (CDMA) Systems a receiver in a node is typically on all the time. In a third example, in Frequency Division Multiple Access Systems (FDMA), a receiver is typically kept on all the time or at least during the duration of a call. Having components of a receiver circuit powered on constantly or at predefined periods, whether or not incoming messages are arriving at the respective nodes can cause the batteries in the nodes to run down at a faster rate than batteries in nodes that use power in a more efficient manner.

Accordingly, power conserving nodes that increase an amount of time that a node may be able to operate without either replacing or recharging the node's battery are desirable. Further, rechargeable batteries are generally able to be recharged a finite number of times before the battery will no longer accept a charge. Power conserving nodes would therefore make it possible to recharge node batteries less often, thus increasing the longevity of the rechargeable batteries.

SUMMARY OF THE INVENTION

Apparatuses and methods are provided for a wireless network that uses power efficiently.

One aspect of the invention is directed to a method for conserving power in a wireless ad hoc network. A device receives a burst via a wireless ad hoc network. The burst includes a preamble, a postamble and one or more blocks of data. The device is in either a low power state or a no power state when the preamble is first received. The device determines whether the preamble includes data indicating an ID of the receiving device. When the determining determines that the preamble includes the data indicating the ID of the device, the device derives from the preamble, information indicating a time and a duration for powering on one or more component of the device to receive one or more blocks of data included in the burst. The at least one component is powered on at a first time period based on the derived information in order to receive the data in the one or more blocks of data. The power remains on for a duration of time based on the derived information. The at least one component is powered off at a specific time period from a beginning of the first time period based on the derived information. The powering on and off is repeated for each of the one or more blocks of data in the burst. The received one or more blocks of data are then processed.

Another aspect consistent with the invention is directed to a method for encoding and transmitting a burst of data from a transmitter to a receiver using low or no power while waiting for reception of the data. A transmitter transmits a wake-up signal to a receiver and at least one block of data to the receiver. The wake-up signal provides structural information of an epoch, which includes the burst of data. The structural information is to be used by the receiver for reception of the burst of data.

Yet another aspect consistent with the invention is directed to a receiver configured to use low or no power. The receiver includes a correlator that is configured to use low or no power when waiting to receive data. A low noise amplifier is configured to receive and amplify analog signals from the correlator. An analog-to-digital converter is configured to convert the amplified signals from the low-noise amplifier to digital signals. Logic is configured to process the digital signals from the analog-to-digital converter. The correlator is configured such that when the correlator determines that the received data is received by an intended destination, the correlator generates a wake-up signal.

A transmitter is provided for transmitting a burst of data to a receiver that uses low or no power while waiting for reception of a burst of data. The transmitter includes a processor to process signals to be transmitted to the receiver. A digital-to-analog converter is configured to convert the signals from the processor from a digital form to an analog form. An up-converter is configured to convert the analog signals from a baseband to an RF band. A filter is configured to filter the RF band signal. An antenna is configured to transmit the RF band signal. The transmitter is configured to transmit a wake-up signal to the receiver. The wake-up signal includes structural information of an epoch. The transmitter is further configured to transmit at least one block of data in a second epoch and is configured to remain in a powered off state until an existence of data to be transmitted.

In another aspect of the invention, a receiver is provided. The receiver is configured to use low or no power when waiting to receive a burst of data. The receiver includes means for correlating configured to use low or no power, means for amplifying received analog signals from the means for correlating, means for converting the amplified signals from the means for amplifying to digital signals, and means for processing the digital signals from the means for converting the amplified analog signals. The means for correlating includes means for generating a wake-up signal. When the means for correlating determines that the receiver is an intended destination of the received data, the means for generating the wake-up signal generates the wake-up signal.

In another aspect of the invention, a transmitter is provided for transmitting a burst of data to a receiver having low or no power. The transmitter includes means for processing signals including data to be transmitted to the receiver, means for converting the signals from the means for processing from a digital form to an analog form, means for up-converting the analog signals from a baseband to an RF band, means for filtering the RF band signal, means for retrieving location information of the receiver, and means for transmitting the RF band signal to the receiver. The transmitter is configured to transmit a wake-up signal to the receiver. The wake-up signal includes structural information of an epoch and is configured to transmit at least one block of data in a second epoch. The transmitter is configured to remain in a powered off state until an existence of the data to be transmitted. The means for transmitting further uses the location information to transmit the wake-up signal to the receiver, such that the wake-up signal arrives at the receiver within a window of a time slot boundary at the receiver.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. The following detailed description does not limit the invention. Instead, the scope of the invention is defined by the appended claims and equivalents.

The following U.S. patents are incorporated herein by reference in their entirety: U.S. Pat. No. 6,574,269, U.S. Pat. No. 6,104,708 and U.S. Pat. No. 6,590,889. U.S. Pat. No. 6,590,889 and U.S. Pat. No. 6,104,708 disclose Direct Sequence Spread Spectrum (DSSS) multi-code-encoding methods and integrated TDMA-CDMA multiple access protocol techniques that permit a system that accommodates terminals and or links of different throughput capabilities to be in an integrated wireless digital network. U.S. Pat. No. 6,574,269 discloses methods that significantly simplify the implementation of a receiver in a wireless system that employs multi-code encoding. The methods taught by these patents may be used in implementations consistent with principles of the invention.

Hardware Overview

Figure 1:
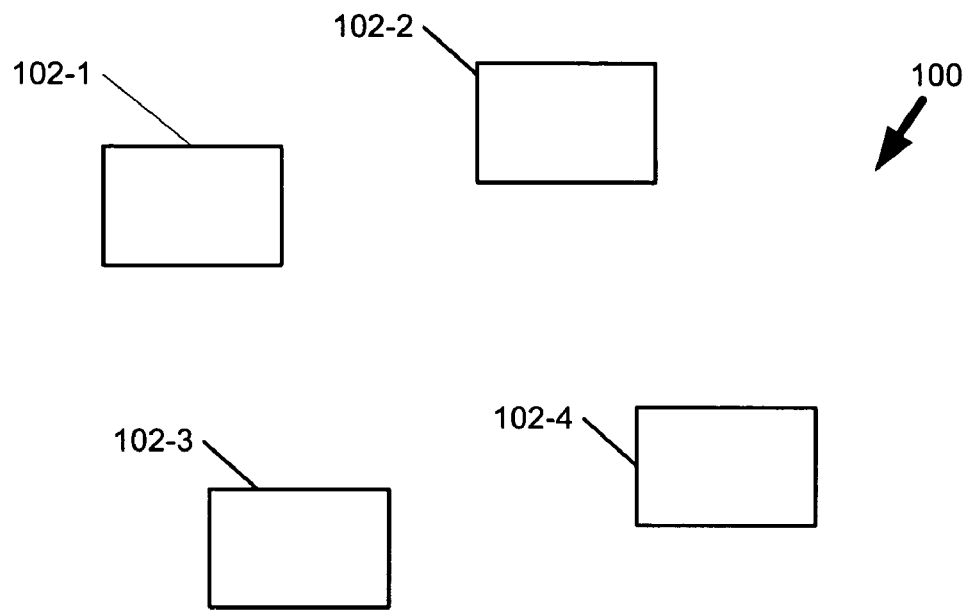
FIG. 1 illustrates an exemplary wireless network including exemplary wireless nodes.

FIG. 1 illustrates an operating environment of an embodiment of the invention. A wireless network 100 is shown having four wireless nodes 102-1 through 102-4 (collectively, wireless nodes 102) that may communicate with one another. Wireless nodes 102 may send a message to another node in wireless network 100, where the other node may be a destination node or may be a relay node for relaying the message to yet one or more other nodes in order to eventually reach the destination node. Although FIG. 1 shows wireless network 100 as having four nodes 102, a wireless network may have fewer or more nodes.

Figure 2:
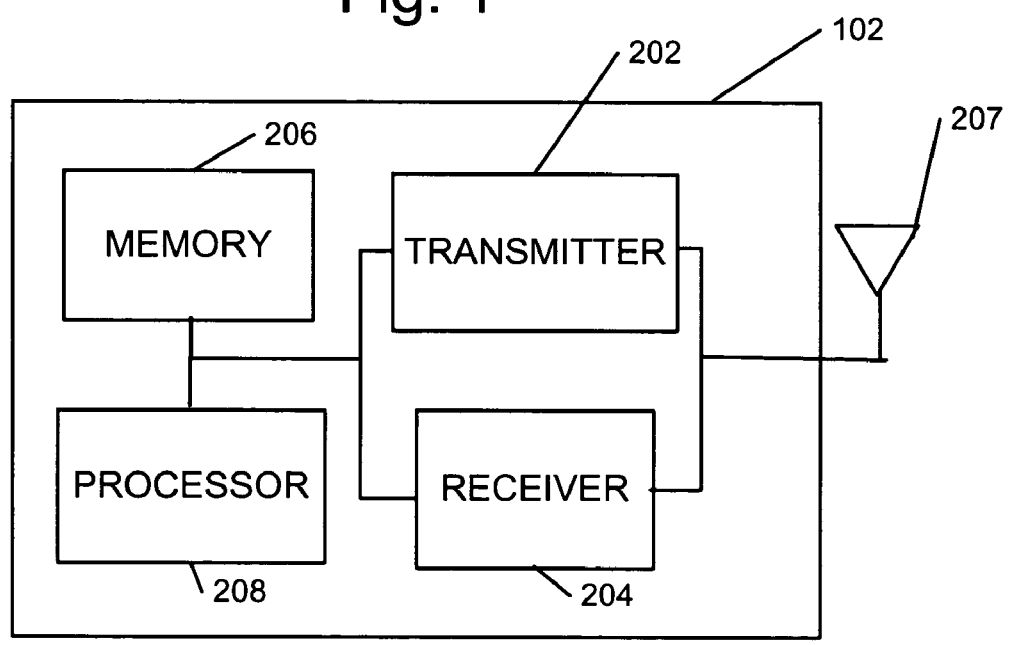
FIG. 2 is a block diagram of an exemplary node.

FIG. 2 illustrates a detailed view of exemplary wireless node 102. Node 102 may have a transmitter 202 for transmitting messages, a receiver 204 for receiving messages, an antenna 207 and storage, for example, a memory 206, for storing, among other things, one or more received messages and one or more messages to be transmitted, and a processor 208, such as a Digital Signal Processor (DSP) for controlling node 102.

Figure 3:
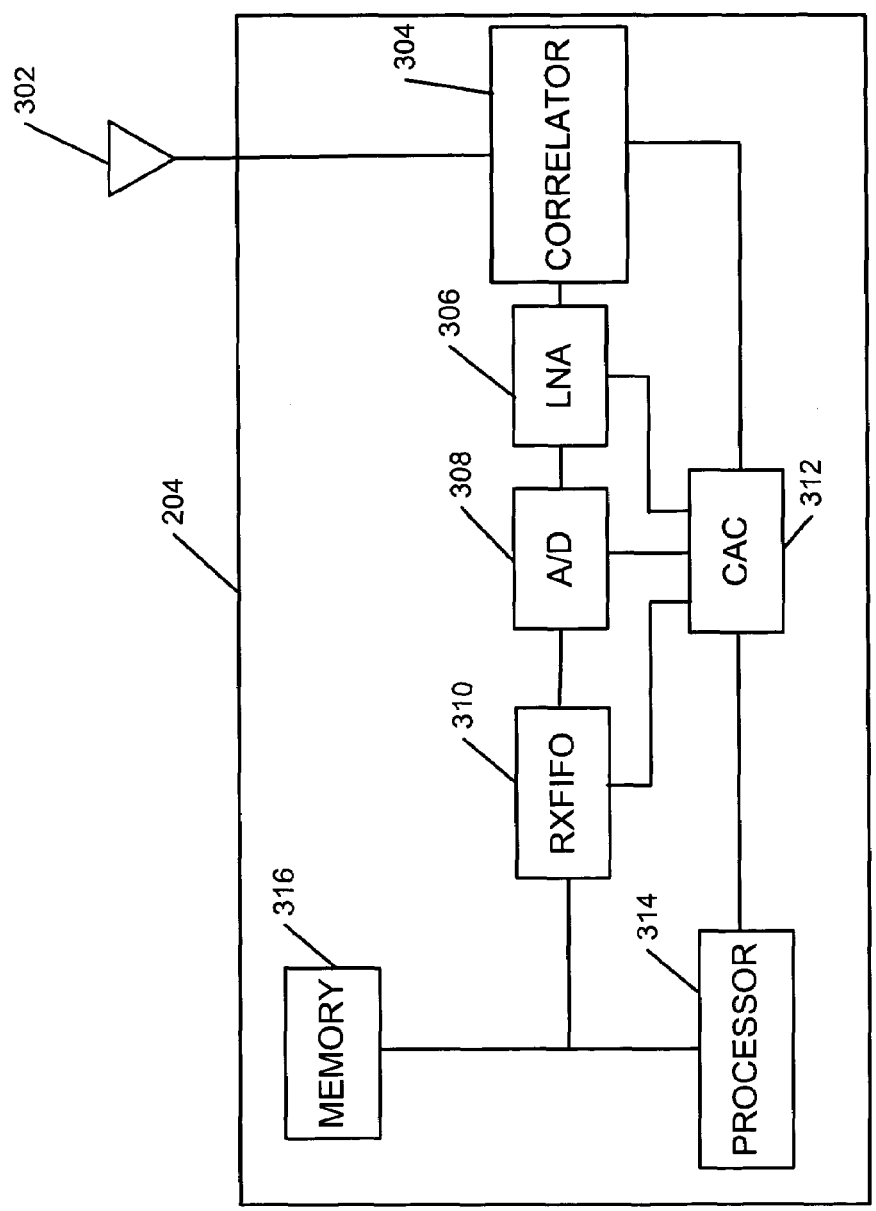
FIG. 3 is a block diagram of an exemplary receiver of the node in FIG. 2.

FIG. 3 shows a detailed view of exemplary receiver 204 of node 102. Receiver 204 may include a correlator 304, an antenna 302, a low noise amplifier (LNA) 306, an analog-to-digital (A/D) converter 308, a receive FIFO buffer (RxFIFO) 310, a circuit activation controller (CAC), a processor 314, and a memory 316. Processor 314 may be a digital signal processor (DSP) or discrete logic, such as an application specific integrated circuit (ASIC) or a field programmable gate array (FPGA).

When not receiving signals intended for the node, node 102 may be in a sleeping state. That is, correlator 304 may be in a low or no power state while correlating received signals. Antenna 302 receives signals, for example, RF signals, which may have been transmitted by another node. Correlator 304 may receive the signals from antenna 302, determine whether the signals include a pseudo-random noise sequence (PRNS) that is associated with an ID or address of receiving node 102 and downconvert the signal from the received band to another band, for example, RF to baseband. Correlator 304 may determine whether a message is intended to be received by the receiving node by determining whether a PRNS in a preamble of the message, matches a predefined PRNS configured in correlator 304. When correlator 304 determines that the message is intended for receiving node 102, node 102 may be awakened from the sleeping state in stages, as will be explained later in more detail.

In some implementations, correlator 304 may be a Surface Acoustic Wave (SAW) correlator that uses little or no power when receiving messages and determining whether the received message was intended to be received by the node. An example of such a correlator is available from Sandia National Laboratories of Livermore, Calif. The existence of such correlators makes possible low power transceivers, tags, locators, and no-power wake-up circuits.

Ultra low power Low Noise Amplifiers (LNAs) have recently been developed. One such LNA, for example, was developed by Sandia National Laboratories. Such a LNA, for example, LNA 306 may be used in embodiments of the invention and may amplify the signal from correlator 304. Analog-to-Digital converter (A/D) 308 may receive the amplified signal from LNA 306, convert the analog signal to a digital signal, and pass the converted digital signal to receive FIFO (RxFIFO) 310 buffer. Activation of LNA 306, A/D 308 and RxFIFO 310 is controlled by a Circuit Activation Controller (CAC) 312.

LNA 306, A/D 308, CAC 312, RxFIFO 310 and processor 314 are normally powered off when there are no incident bursts addressed to the receiving node or having the PRNS of the receiving node. CAC 312 may be activated by a wake-up pulse generated by correlator 304. The burst preamble may be encoded such that a pair of wake-up pulses are generated by correlator 304. The first wake-up pulse may activate CAC 312 and inform CAC 312 when to power on LNA 310, A/D 308 and RxFIFO buffer 310 while a burst is being received by correlator 304. LNA 306, A/D 308 and RxFIFO buffer 310 may not be powered on for the entire time in which the PRNS of the burst is being stored and correlated by correlator 304. The second wake-up pulse may inform CAC 312 when to power off LNA 306, A/D 308 and RxFIFO 310. Normally memory 316 and processor 314 are powered off or operate in a low power mode while the burst is being stored in RxFIFO buffer 310. The burst may be encoded such that an end of burst pulse may be generated by correlator 304. The end of burst pulse may cause CAC 312 to power off LNA 306 and A/D 308 and instruct RxFIFO buffer 310 to wake up memory 316 and initiate transfer of the received samples stored in RxFIFO buffer 310. Normally data transfer from RxFIFO buffer 310 to the memory 316 is performed using direct-to-memory access (DMA) techniques that do not require processor intervention. A RxFIFO empty flag may cause processor 314 to become active. Processor 314 may then read the samples stored in memory 316, power off RxFIFO buffer 310 and process the data included with the burst. While the received data samples are being processed by processor 314 and while there is no incoming burst destined for the receiving node, LNA 306, A/D 308 and RxFIFO buffer 310 may be deactivated consuming little or no power. Processor 314 may remain active until the received message is queued for transmission to another node in the network or to a user interface port.

Figure 4:
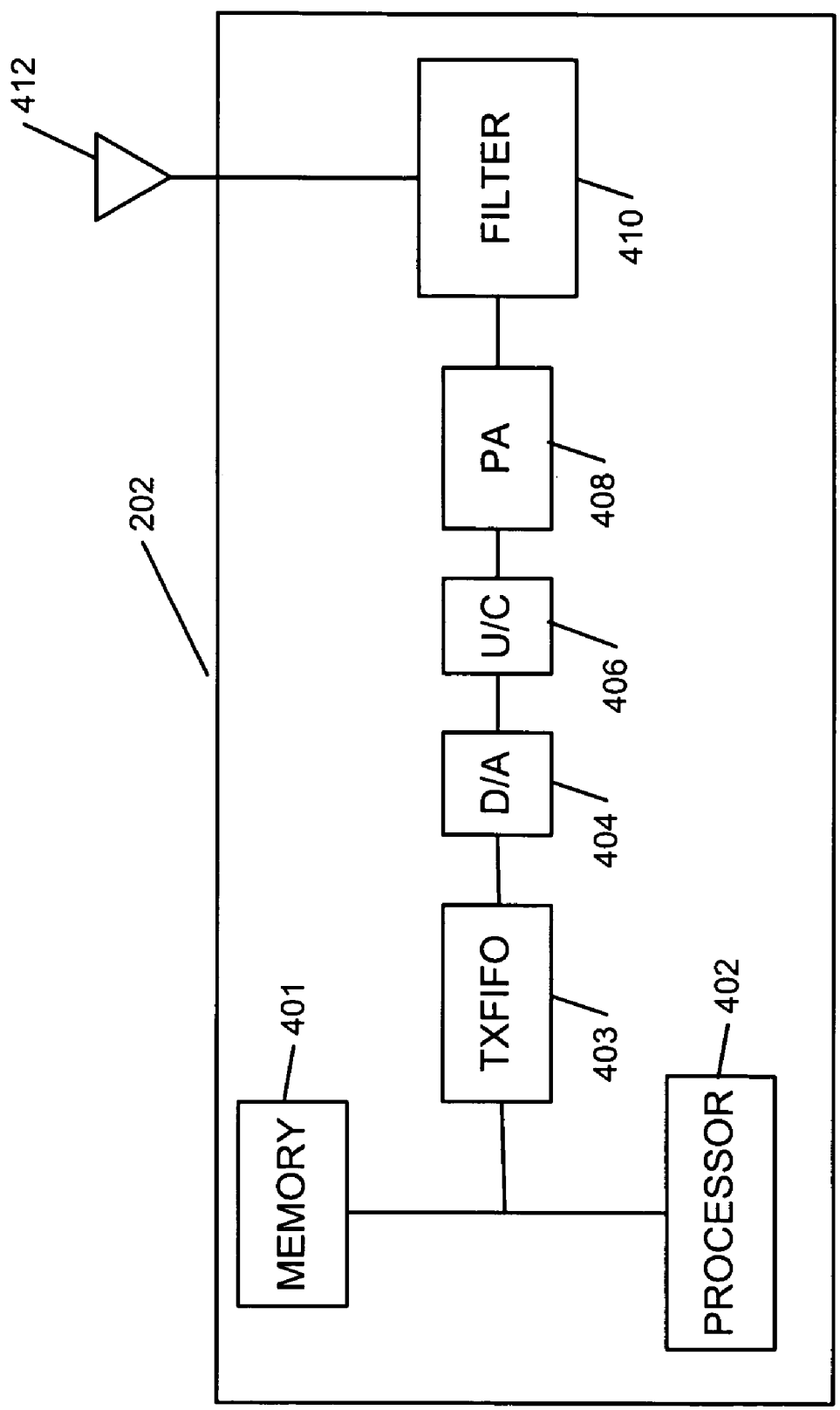
FIG. 4 is an exemplary transmitter of the node of FIG. 2.

FIG. 4 illustrates exemplary transmitter 202 in detail. Receiver 204 may include a memory 401, a processor 402, a transmit FIFO buffer (TxFIFO) 403, a digital-to-analog converter (D/A) 404, an up-converter (U/C) 406, a power amplifier (PA) 408, a filter 410 and an antenna 412.

Processor 402 may be a processor, such as a DSP or discrete logic, such as an application specific integrated circuit (ASIC) or a field programmable gate array (FPGA). Processor 402 may prepare a message for transmission and send the resulting digital signals representing the message to TxFIFO 403 and digital-to-analog converter (D/A) 404. D/A 404 may convert the digital signals received from TxFIFO 403 to analog format and send the analog signals to U/C 406, which may convert the signals from one band, for example, baseband, to another band, for example, RF. The signals may then be amplified by PA 408, filtered by filter 410 and transmitted to another node via antenna 412.

TxFIFO 403, D/A 404, U/C 406 and PA 408 are normally kept powered off while the TxFIFO 403 is empty to conserve power. TxFIFO 403 may be activated by processor 402 when there is a message to be transmitted. D/A 404, U/C 406 and PA 408 are activated and kept activated for the entire time the TxFIFO 403 is not empty.

Although FIGS. 3 and 4 show the transmitter and receiver each having a dedicated antenna, processor and memory, a single processor, memory and antenna may be shared by the transmitter and receiver in some implementations.

Concept of Operations

The following explains operational aspects of some implementations in which components of a receiver are powered on and off to receive and process signals and are otherwise in a powered off or a low power state. The operational aspects are explained with reference to timing diagrams of FIGS. 5A–5G and flowcharts of FIGS. 6 and 7.

FIGS. 5A–5F are exemplary timing diagrams that help illustrate operational aspects of implementations consistent with principles of the invention. The timing diagrams will be explained with exemplary nodes that use Code Division Multiple Access (CDMA) and a Direct-Sequence Spread Spectrum (DSSS) technique to modulate and Multi-Code (MC) encode signals including the message.

Figures 5A, 5B, 5C, 5D, 5E, 5F, 5G:
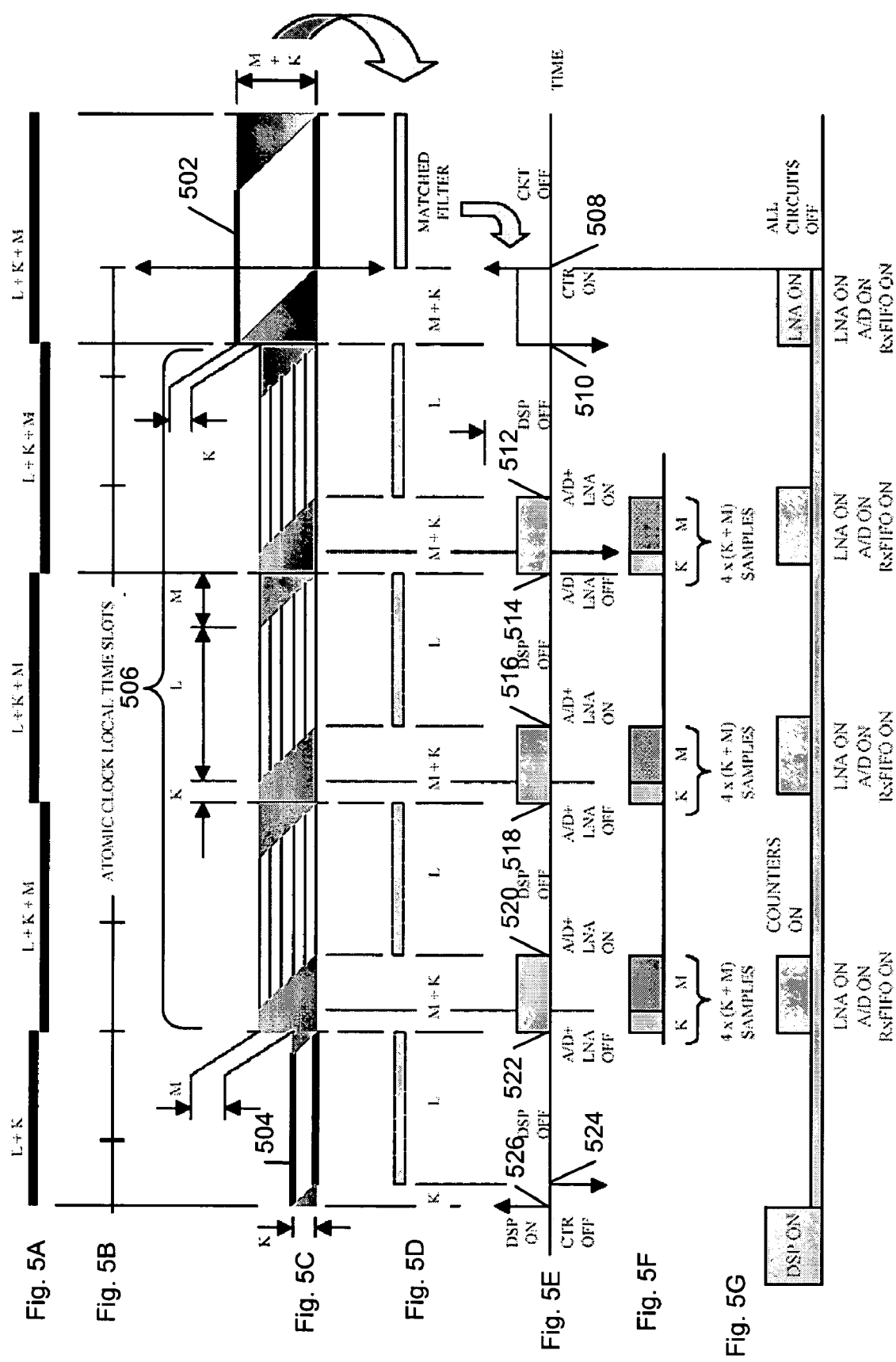
FIGS. 5A–5G are timing diagrams that illustrate timing, activation, and deactivation of components within an exemplary receiver.

In one implementation, all nodes in the network have a common notion of time intervals or time slots in absolute terms. That is, all nodes in the network may be synchronized. Synchronizing nodes in a network is well known. Some ways that this may be accomplished include utilizing GPS information or atomic clocks. FIG. 5B illustrates synchronized atomic clock time slots in an exemplary implementation.

FIGS. 5C–5G are timing charts showing the time of a transmission of an exemplary message having a preamble 502, a postamble 504, and multiple blocks of data 506. Each receiver may have a predefined ID, such as a MAC ID, defined at manufacturing time. The preamble, data blocks and postamble may include one or more DSSS shift-or-thogonal-codes, where each shift-orthogonal-code is a cyclic-shift version of a selected base PRNS, having encoded therein a MAC ID or other indication of an intended destination node. Each shift-orthogonal-code when correlated with or passed through a filter that is matched to the selected base PRNS produces at its output a pulse that reproduces an impulse response of an underlying transmission channel and a shift-delay of each shift-orthogonal-code with respect to the base PRNS. Preamble 502 may include two high-gain shift-orthogonal-codes with easily detectable wake-up pulses at the output of the matched filter or correlator. The two shift-orthogonal codes of the preamble are a distance of M+K codes apart, where M is the number of modulated-data symbols or bits transmitted per data block 506 and K is a number of chip times required for M bits to be flushed from a correlator, such as, for example, correlator 304. The first and second shift-orthogonal-codes are cyclically padded at the end and at the beginning respectively, each with at least M+K−1 chips of cyclic padding to enforce the orthogonality of the signals being received and the exact reproduction of the impulse response of the underlying transmission channel for each of the cyclic-shift-codes received. A length of a Finite Impulse Response (FIR) determines a size of K.

In some implementations, each node may store information concerning locations of other nodes. The relative location information, for example, node xyz coordinates, can be used to determine signal attenuation as the signal propagates from the transmitter to the receiver and the Signal to Noise Ratio (SNR) of the received signal at the output of the correlator, for example, correlator 304. Alternatively, the SNR can be estimated by comparing, for example, the relative peak power of the preamble wake-up pulses with the average power of the signal in between such pulses. The SNR, together with a message Quality of Service (QoS) information, for example Bit Error Rate (BER), determines the number of modulated-data-symbols per data block and the maximum allowed delay determines the modulation technique and the number of bits per modulated-data-symbol. Modulation techniques for multiple-bits per modulated-data-symbol are very well known, such as M-ary Phase-Shift-Keying (PSK), M-ary Pulse Amplitude Modulation (PAM) and M-ary Quadrature Amplitude Modulation (QAM), with $M=2^b$, where "b" is a number of bits per modulated-data-symbol.

The relative location information may be used to determine the propagation delay and a time to transmit a message to a specific node such that the message arrives at the specific node within a small time window. Techniques for obtaining signal propagation delays are well known, such as distance calculations using node coordinates, for example, using GPS, or direct propagation delay measurements using spread spectrum techniques with maximal-length pseudo noise sequences (m-sequences) or spread spectrum codes with correlation properties similar to the shift-orthogonal-codes included therein.

When receiver 204 receives the pseudo-random noise (PN) sequence codes having the high-gain wake-up pulse, the received codes may be matched by correlator 304 to detect the first wake-up pulse. The processing gain at the output of the correlator may be 10 $\text{Log}_{10}$ L/M, where L is a length of the shift-orthogonal-code, excluding the cyclic padding, and M is the number of shift-orthogonal-codes per block (M=2 for the preamble 502 and postamble 504 and M=L−K for the transmitted data blocks 506).

In some implementations, counters may be activated to count the amount of time between the first and second wake up pulses from the preamble. The determined amount of time, M+K, may be used to determine when to power on and off A/D 308, LNA 306 and RxFIFO 310. In some implementations, the wake-up pulses may not be permitted to activate the counters unless collision free reception of the preamble is determined with high probability. That is, the first wake-up pulse, matched to the correlator 304, must be detected within a narrow time window, for example, two chip times, of a time-slot boundary. The amplitude of the wake-up pulses and/or the power of the signal between pulses and/or in other points of the time-slot may be used to determine whether a collision occurred, as well as to estimate signal-to-noise ratio. In some implementations the relative positions of the detected pulses with respect to the time-slot boundaries may be measured and, after the relative positions are sent back to the transmitter, the transmitter may correct the estimated propagation delay. In some implementations the form and power of the signal between pulses and/or in other points of the time-slot may be used to measure the multipath, for example, from signal reflections, and may be used to further improve the SNR of the pulses received in the data blocks. Techniques to increase the SNR using the multipath-reflected signal energy are well known and include techniques such as RAKE processing at the receiver, for example, to constructively and/or coherently combine the signal energies from two or more multipaths, and/or signal precoding by the transmitter, for example, to encode the transmitted signals such that the direct-path and one or more reflected signals arrive time-synchronized at the intended receiver node.

Blocks of data 506 or sub-bursts may each include a portion of the message. Each block 506 may include consecutive shift-orthogonal-codes of length L and M+K cyclic padding chips, where a chip is a smallest element of data in an encoded signal. The splitting of the cyclic padding chips at the start and at the end of each shift-orthogonal-code vary by one for each consecutive code, starting with the first shift-orthogonal-code will all M+K cyclic padding chips at the end. Each chip may be a binary number, an integer-valued number, a real-valued number, or a complex-valued number. Each modulated data symbol may convey information of one or more bits. M of the shift-orthogonal-codes may be transmitted simultaneously (superimposed) in each block. Each shift-orthogonal-code may be encoded by being multiplied, chip by chip, by a bit or a modulated-data-symbol. With multi-code encoding and binary modulation such as Binary-Phase Shift Keying (BPSK), the message is divided in blocks of bits with as many bits per block as the number of shift-orthogonal codes being transmitted simultaneously, and distinct bits of each block are encoded using different shift-orthogonal-codes, each shift-orthogonal-code being a different cyclic-shift of a base PRNS. With multi-code encoding and multi-bit modulation such as M-ary QAM with b=$\log_2$M bits per symbol, the message is divided in blocks of bits with as many bits per block as the number of bits "b" per modulated-data-symbol multiplied by the number of shift-orthogonal-codes being transmitted simultaneously, and distinct modulated-data-symbols of each block are encoded using different shift-orthogonal-codes. As illustrated in the exemplary charts of FIGS. 5A and 5C, each of the blocks of data are transmitted within a time period of L+K+M. Each of these L+K+M time periods having a block of data to transmit may be referred to as a time-slot or an epoch. Postamble 504 includes two shift-orthogonal-codes cyclically shifted K bits from each other.

FIGS. 5D–5E help to explain the waking up of components of a receiver in stages in an exemplary implementation. Before the correlator determines that node 102 is an intended destination of a message, power in the node may be either low or off. At the point 508, after correlator 304 determines that the message is intended for the receiving node 102, the first wake-up pulse is detected and a counter may be started. At the point 510, the second wake-up pulse is detected and the counter stopped. Thus, in this example, the counter measures a time corresponding to M+K chip times. If a collision is detected, the receipt of the message is aborted. The required counters as well the circuits and/or logic required to detect collisions may be included in CAC 312.

At the point 512, after receipt of an L length code in a first epoch of the message, LNA 306, A/D 308 and RxFIFO 310 may be powered on. A/D 308 may be powered on for a period of M+K chips and then powered off at the point 514. This period is long enough to convert M chip times worth of data from analog to digital format and to allow any remaining data to be flushed from correlator 304. RxFIFO 310 and A/D 308 power on and off times may be delayed with respect to each other to accommodate internal delays in the A/D 308 circuitry.

At the point 516, after receipt of an L length code in a second epoch of the message, LNA 306, A/D 308 and RxFIFO 310 are powered on for a period of M+K chip times and then powered off at 518.

At the point 520, after receipt of an L length code in a third epoch of the message, LNA 306, A/D 308 and RxFIFO 310 are powered on for a period of M+K chip times and then powered off at 522.

At the point 524, correlator 304 detects an end of burst pulse corresponding to the first shift-orthogonal code in the postamble. At the point 526, a time period of K chip times after reception of the first shift-orthogonal-code, correlator 304 detects a second pulse corresponding to the second shift-orthogonal-code in the postamble indicating that the burst reception has completed and that the received burst stored in the RxFIFO 310 is ready to be transferred to memory 316. Data transfer from RxFIFO 310 to memory 316 may be implemented while a processor 314, such as a DSP, is powered off or operating in a low power mode using well known direct-to-memory transfer techniques, for example, using Direct-Memory Access (DMA) devices. After the data transfer to memory 316 has completed, processor 314 may be powered on to process the complete message and may then be powered off.

FIG. 5F illustrates the sampling of data received during sub-bursts 506. Each of the K+M chip times worth of modulated-data-symbols of each sub-burst may be sampled by A/D 308 at least once per chip time and typically four times over the K+M chip time interval. It is well known that the wider the bandwidth of filter 410, the faster A/D 308 has to operate. Consequently, the faster A/D 308 operates, the more power A/D 308 consumes. In some implementations, the bandwidth of filter 410 may be optimized such that A/D 308 may operate at a rate of one sample per chip time, thereby minimizing power consumed by A/D 308.

FIG. 5G illustrates points at which LNA 306 and A/D 308 are powered on and off in an implementation consistent with the principles of the invention. As can be observed, LNA 306 and A/D 308 are powered on only for a time period having a duration of M+K chip times beginning immediately after reception of a first code within preamble 502 and within each block of data 506.

Transmitter Processing

Figure 6:
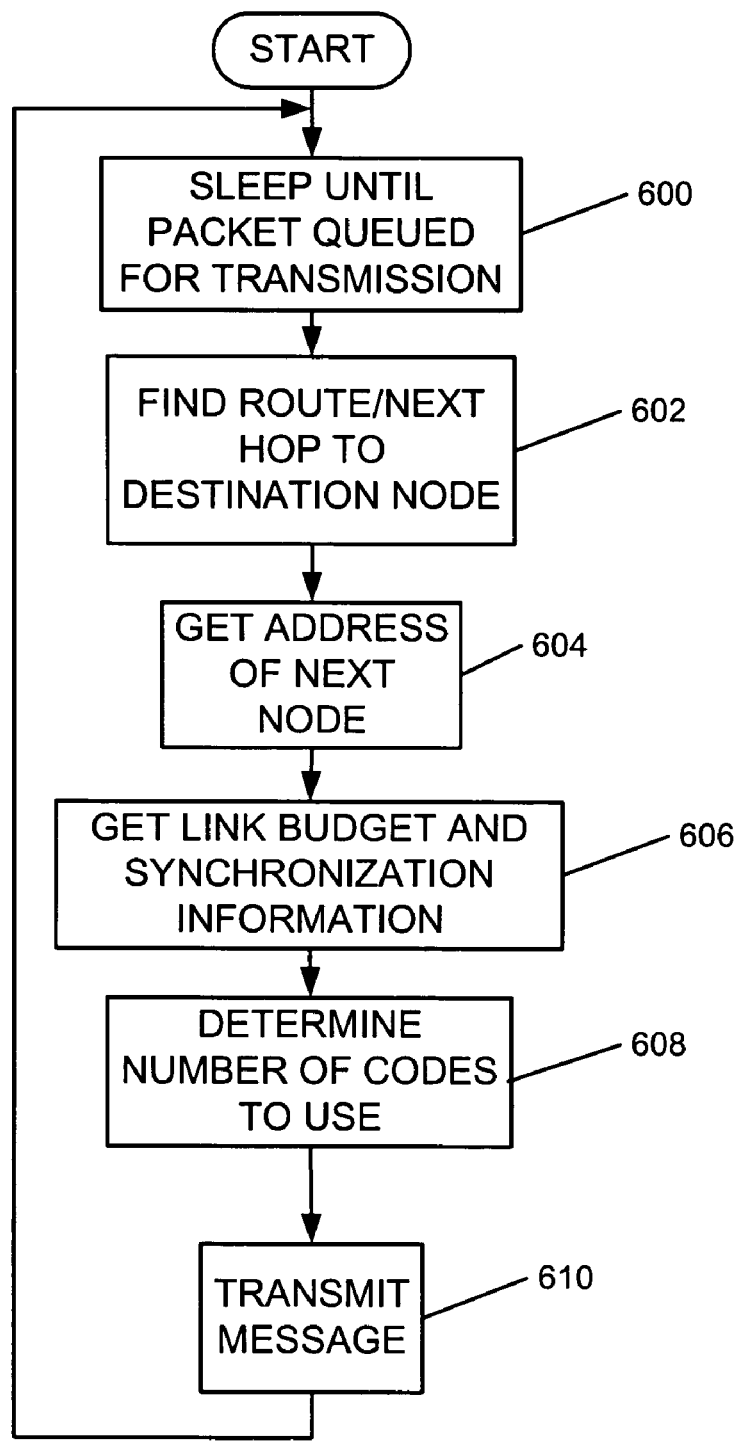
FIG. 6 is a flowchart that illustrates processing in an exemplary transmitter.

FIG. 6 is a flowchart illustrating exemplary processing for the transmission of messages from one of exemplary nodes 102. Transmitter 202 may sleep until a packet is queued for transmission (act 600). When a packet is queued for transmission, node 102 may determine whether the destination node can be reached directly or whether another node must be used to relay the message to be transmitted to the destination node (act 602). Node 102 obtains the ID or address of the next node (act 604) and link budget and synchronization information (act 606). Based on the link budget and on message QoS parameters, such as BER and maximum delay, node 102 may determine a number or bits per modulated-data-symbol and a number of shift-orthogonal-codes to use when transmitting epochs 506 (act 608). The message is then transmitted to a receiving node (act 610) in the form shown in FIG. 5C while powering on-and-off the transmitter modules 402 through 412 as required, as previously discussed. If no other packets are queued for transmission, node 102 goes to sleep until another packet is queued for transmission (act 600).

Receiver Processing

Figure 7:
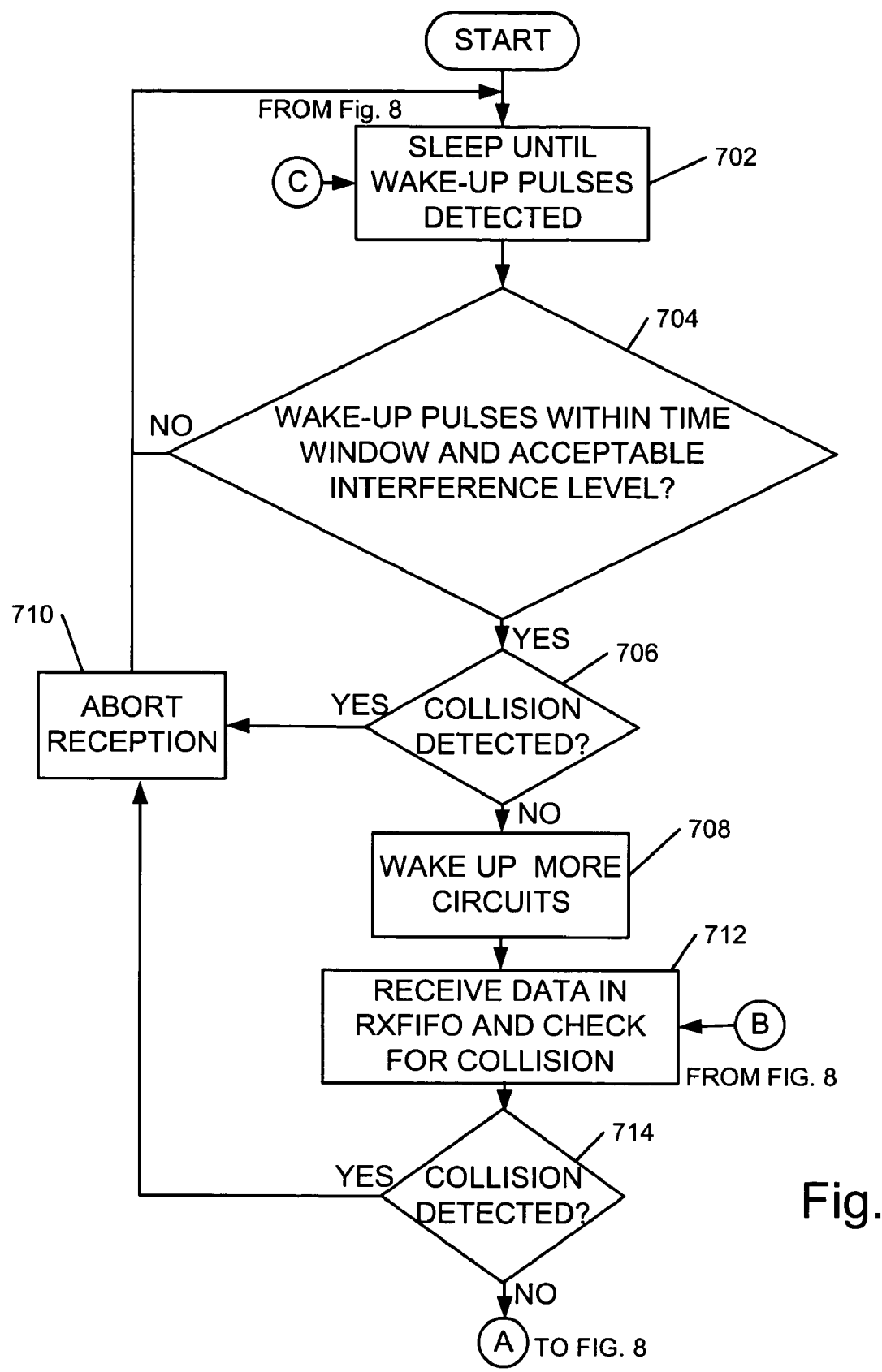
FIGS. 7–8 are flowcharts that illustrate processing in an exemplary receiver.
Figure 8:
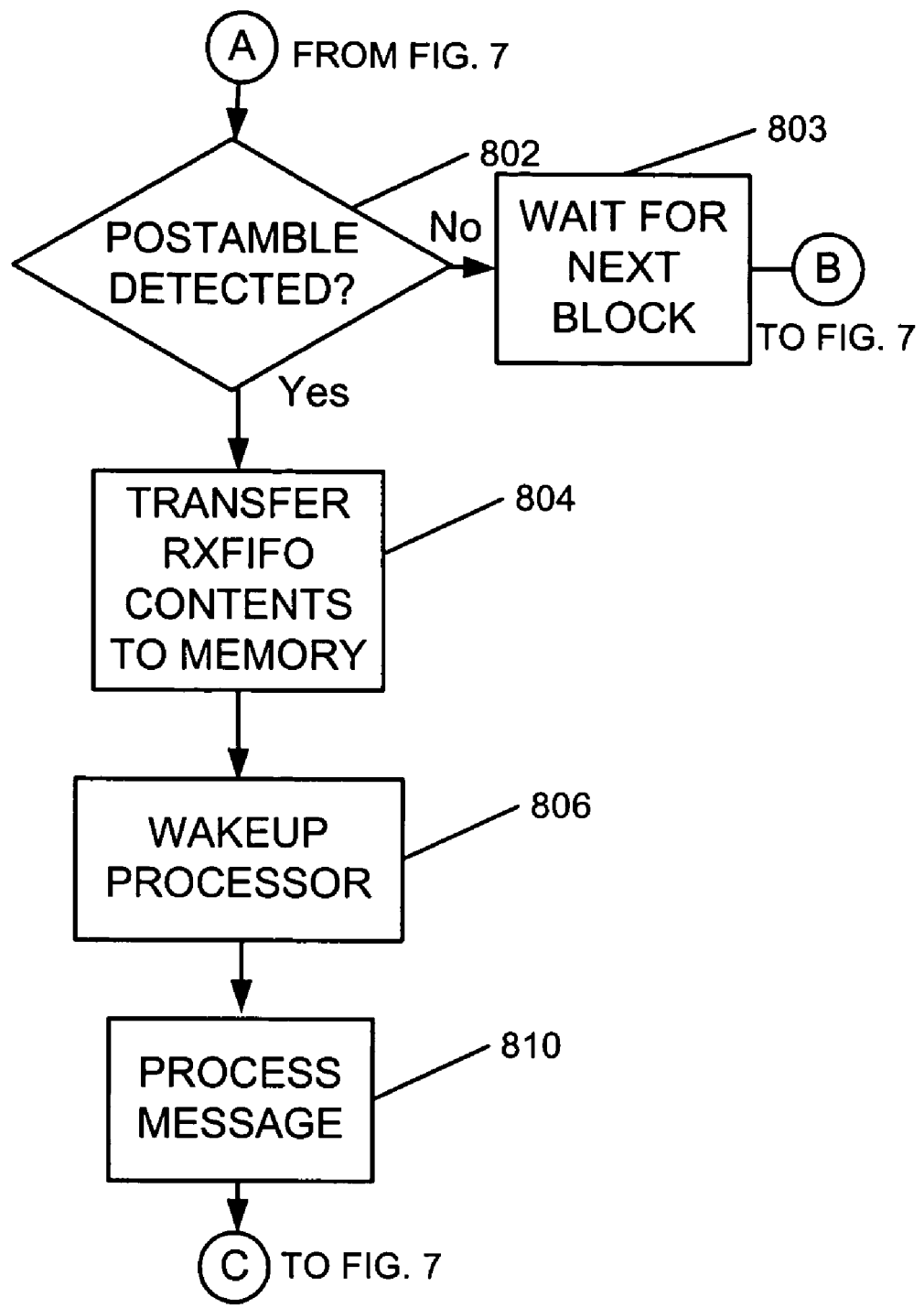

FIG. 7 is a flowchart illustrating exemplary processing for the reception of messages in one of nodes 102. Receiver 204 sleeps until wake-up pulses are detected (act 702). The wake-up pulses may be generated by correlator 304 when correlator 304 detects an ID match that matches the correlator PRNS while processing a preamble. CAC 312 may determine whether the first of two wake-up pulses occurs within a narrow window close to a beginning of a time slot, for example, within two chips times, and whether the detection can be performed free of collision and/or within acceptable levels of interference (act 704). If not, the receiver goes to sleep (act 702). If a collision is detected at this point (act 706), the reception of the message may be aborted (act 710) and the receiver goes to sleep (act 702). Otherwise, more circuits are awakened (act 708) as previously described with respect to FIGS. 5E and 5G. A data block is received and stored in RxFIFO 310 (act 712), as previously described with respect to FIGS. 5E and 5G (i.e., LNA 306, A/D 308, RxFIFO 310 and processor 314 are powered on and off as described previously). After receiving each block, a check may be made to determine whether a collision occurred and whether the data block was received within acceptable levels of interference (act 714). If a collision was detected or the interference was not within acceptable levels, the reception may be aborted (act 710) and the receiver goes to sleep (act 702). Otherwise, CAC 312 may determine whether a postamble was detected (act 802). If no postamble was detected, then receiver 204 may wait for the next data block (act 803). If the postamble was detected, then memory 316 may be powered on and contents of RxFIFO 310 may be moved to memory 316 (act 804). CAC 312 may, upon detection of an empty RxFIFO 310, activate processor 314 (act 806). Processor 314 may then process the received message in memory (act 810), Receiver 204 may then sleep until wake-up pulses are detected (act 702).

CONCLUSION

Methods and systems consistent with the principles of the invention may provide a power-conserving method for transmitting and receiving data in a wireless network.

The foregoing description of preferred embodiments of the invention provides illustration and description, but is not intended to be exhaustive or to limit the invention to the precise form disclosed. Modifications and variations will be apparent to those skilled in the art in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method for conserving power in a wireless ad hoc network, comprising:
    receiving, in a device, a burst via the wireless network, the burst including a preamble, a postamble and one or more blocks of data, the device being in one of a low power state and a powered off state at a time when the preamble is received:
    determining whether the preamble of the burst includes data indicating an ID of the receiving device;
    when the determining determines that the preamble includes the data indicating the ID of the receiving device, performing:
        deriving, from the preamble, information indicating a time for powering on one or more components of the device to receive the one or more blocks of data included in the burst;
    powering on the one or more components at a first time period based on the derived information in order to receive the data in a block of the one or more blocks;
    powering off the one or more components at a specific time period from a beginning of the first time period based on the derived information;
    repeating the powering on and the powering off for each of the one or more blocks of data in the burst; and
    processing the received one or more blocks of data.

2. The method of claim 1, wherein the processing comprises:
    powering on a second component of the receiving device after a second time period occurs after a beginning of reception of the postamble.

3. The method of claim 2, wherein the second component includes a digital signal processor configured to process the received one or more blocks of data.

4. The method of claim 1, wherein the one or more components include an analog-to-digital converter configured to convert a received one of the blocks of data from analog to digital form.

5. The method of claim 1, further comprising:
    powering on a low noise amplifier simultaneously with a first execution of the powering on of the one or more components for the received burst; and
    powering off the low noise amplifier after reception of a last one of the blocks of data of the received burst.

6. The method of claim 1, wherein the network includes a plurality of devices, the method further comprising synchronizing the plurality of devices.

7. The method of claim 6, wherein the deriving, the powering on, the powering off, the repeating and the processing are performed when the determining determines that the preamble includes the data indicating the ID of the receiving device and the burst is received within a narrow window within a time slot, including a narrow time window of a time slot boundary.

8. The method of claim 6, wherein the deriving, the powering on, the powering off, the repeating and the processing are performed when the determining determines that the preamble includes information indicating the ID of the receiving device, and the burst is received within a narrow time window of a time slot and a collision-free reception occurred.

9. The method of claim 1, further comprising:
deriving from the preamble, information regarding interference; and
deriving from at least one of the one or more data blocks, the information regarding interference; and
when the information regarding interference indicates an occurrence of an unacceptable level of interference, aborting the receiving of the burst.

10. The method of claim 1, further comprising:
generating a wake-up signal when the determining determines that the preamble includes the data indicating the ID of the receiving device, wherein
the deriving occurs responsive to the generating of the wake-up signal.

11. The method of claim 1, wherein the burst is a direct-sequence spread spectrum transmitted burst.

12. The method of claim 11, wherein the received burst was transmitted with a superposition of direct-sequence spread spectrum cyclic-shifted codes, wherein each of the direct-sequence spread spectrum cyclic-shift codes is a cyclic-shift of a base code, including a pseudo-random noise sequence having a sequence of a plurality of chips, each chip having a value that is one of a binary number, an integer-valued number, a real-valued number, and a complex-valued number.

13. The method of claim 12, wherein each of the cyclic shift codes is multiplied by one of a bit and a modulated-data-symbol.

14. The method of claim 13, wherein each of the modulated-data-symbols conveys information of at least one or more bits.

15. The method of claims 14, wherein a multi-code sub-burst is received, by the device, with a filter matched to a base code.

16. The method of claim 14, wherein:
a multi-code sub-burst is received, by the device, with a cyclic correlator matched to a base code, and
after being sampled and stored, the received sub-burst is correlated with all cyclic codes included in a multi-code sub-burst.

17. The method of claim 15, wherein the filter includes Surface Acoustic Wave technology at a convenient intermediary frequency or a radio frequency.

18. The method of claim 15, wherein a signal at an output of the filter, after being down-converted from radio frequency to baseband frequency, results in a sequence of modulated data symbols that, in an absence of noise, reproduces a sequence of modulated data symbols used, by the transmitter, to multiply the cyclic codes included in the each of multi-code sub-bursts.

19. The method of claim 15, wherein the preamble detected at the output of the filter is used as a wake-up signal comprising two pulses at a distance of M+K chip-times from each other, where M is a number of bits or modulated-data-symbols included in each of the subsequent data sub-bursts, and K is a number of chip times required to flush out the filter.

20. The method of claim 19, wherein a value, M+K, is used to power on a low noise amplifier simultaneously with a first execution of the powering on of the one or more components, including the powering on of devices performing sample-and-hold (S/H) and analog to digital (A/D) conversion, and a memory device used to store sampled data.

21. The method of claim 16, wherein the cyclic correlator is implemented in one of hardware and software using Fast Fourier Transform techniques.

22. The method of claim 18, wherein each cyclic shift of a received multi-code sub-burst corresponds to one chip time of the signal at the output of the filter.

23. The method of claim 18, wherein a time-domain signal detected at the output of the filter reproduces the sequenced transmission of the modulated-data-symbols of the each of the multi-code sub-bursts over a channel between a transmitter and a receiver, with a transmission being performed at a rate of one modulated data symbol per chip time, including one chip-time of guard-time for each unused cyclic shift-code in the each of the multi-code sub-bursts.

24. The method of claim 23, wherein the postamble detected at the output of the filter is used as an end-of-burst signal comprising two pulses at a distance of K chip times apart, where the value K is a number of chip times required to flush out the filter.

25. The method of claim 24, wherein the end-of-burst signal is used to power off a low noise amplifier simultaneously with a last execution of the powering off of a last received block of data in the burst, including powering off of devices performing sample-and-hold (S/H) and analog to digital (A/D) conversion, and a temporary memory device used to store sampled data.

26. The method of claim 24, wherein the end-of-burst signal is used to power on a Direct-to-Memory Access device used for transferring the data from the temporary memory to another memory.

27. The method of claim 24, wherein a processor is powered on when or after a last block of data in the burst is transferred from the temporary memory to another memory.

28. The method of claim 24, wherein, at the end-of burst signal, a value, K, is used to reassemble the received burst from the received data sub-bursts.

29. The method of claim 24, wherein a processor is powered off or put on a low power mode after assembling and processing a received burst.

30. The method of claim 13, wherein each of the cyclic-shift codes, after being multiplied by the bit or the modulated data symbol, are added together forming a multi-code block.

31. The method of claim 30, wherein the first of the cyclic-shift codes is cyclically-padded at an end by at least as many chips as a number of cyclic-shift codes included in the multi-code block, including unused cyclic-shift codes.

32. The method of claim 30, wherein the last of the cyclic-shift codes is cyclically-padded at a beginning by at least as many chips as a number of cyclic-shift codes included in the multi-code block, including unused cyclic-shift codes.

33. The method of claim 30, wherein respective intermediated ones of the cyclic-shift codes are cyclically padded at an end and at a beginning by as many chips as a relative position of the respective intermediated ones of the cyclic-shift codes in the multi-code sub-burst.

34. The method of claim 30, wherein the cyclic-shift codes include cyclic-padding having additional chips at an end and at a beginning to accommodate signal extensions that occur due to the non-zero length of an impulse response of a channel between a transmitter and a receiver.

35. The method of claim 13, wherein information is transmitted in bursts, each burst composed of consecutive multi-code sub-bursts, including a preamble sub-burst with at least two cyclic-codes, one or more data sub-bursts, each with one or more cyclic-codes, and postamble sub-bursts with at least two cyclic-codes.

36. The method of claim 35, wherein at least one of an amplitude, a phase of the modulated data symbols, and a cyclic-shift separation between consecutive ones of the cyclic-shift codes in the preamble conveys structural information regarding a time composition of a remaining portion of the burst.

37. The method of claim 36, wherein the preamble includes two cyclic shift codes at M+K cyclic-shifts apart, where M is a number of modulated data symbols transmitted per data sub-burst and K is a total length of an impulse response of a channel between a transmitter and a receiver measured in chip times.

38. The method of claim 35, wherein at least one of an amplitude, a phase, and a cyclic-shift separation between consecutive ones of the cyclic-shift codes in the postamble conveys additional structural information about a time composition of a preceding portion of the burst.

39. The method of claim 38, wherein the postamble includes two cyclic shift codes at K cyclic-shifts apart, where K is a total length of an impulse response of a channel between a transmitter and a receiver measured in a number of chips.

40. The method of claim 35, wherein the one or more data sub-bursts are encoded using one or more cyclic-codes with consecutive cyclic-shifts, each of the one or more data sub-bursts of a burst includes an equal number of cyclic-codes.

41. The method of claim 35, wherein the cyclic-codes in the preamble, the data sub-bursts, and the postamble sub-bursts are generated from a common base sequence.

42. The method of claim 35, wherein different bursts transmitted from a transmitting device use different base sequences and include a different number of data sub-bursts per burst.

43. The method of claim 35, wherein data sub-bursts of different bursts use modulation constellations with a different number of bits per modulated-data-symbol.

44. The method of claim 12, wherein multiple devices transmit simultaneously and each transmission is to one of a specific device, a group of devices, and broadcast to all receiving devices in the network.

45. The method of claim 44, wherein a base code is uniquely-assigned to each of the devices, and the uniquely-assigned base code indicates a unique ID for the each of the devices.

46. The method of claim 45, wherein a base code, distinct from any of the uniquely-assigned base codes, is assigned to the group of devices, and the assigned base code indicates a unique group ID or multicast ID for a group of devices.

47. The method of claim 46, wherein a base code, distinct from any of the uniquely-assigned base codes, and also distinct from any of the group ID base codes assigned to groups of devices, is assigned to all devices in the network, and the assigned base code indicates a network broadcast ID.

48. The method of claim 12, wherein a base code is uniquely-assigned to the device, and the uniquely-assigned base code indicates a unique ID for the receiving device.

49. The method of claim 12, wherein a receiving device having a broadcast ID is equipped with at least a filter or a cyclic correlator that is matched to a base code indicating a network broadcast ID.

50. The method of claim 49, wherein the network broadcast ID is used by a transmitting device to inform one or more neighbor receiving devices of their own node unique ID and an eventual group ID.

51. The method of claims 12, wherein a receiving device having a group ID is equipped with a filter or a cyclic correlator that is matched to a base code indicating a receiving device group ID.

52. The methods of claim 12, wherein the device has a unique ID and is equipped with a filter or a cyclic correlator that is matched to a base code indicating the unique ID of the device.

53. The method of claim 52, wherein the matching base code for the cyclic correlator is programmable.

54. The method of claim 52, wherein operations of the filter are performed by hardware, software, or combination thereof.

55. The method of claim 52, wherein an input signal for the filter or the cyclic correlator is sampled and stored, and correlating operations are made consecutively and as required to check for matches with a base code indicating either a network broadcast ID, a receiving device group ID, or the unique ID of the device.

56. The method of claims 1, wherein the burst includes a base code indicating one of a broadcast ID and a group ID that includes information indicating a first of a plurality of cyclic codes used in the preamble, the block of data or the postamble.

57. The method of claim 56, wherein the first of the cyclic codes indicates a number of chip-times from a start of time-slot in which a first data symbol used in each of the data blocks is detected.

58. The method of claim 1, wherein:
the burst includes a cyclic code from a base sequence indicating a broadcast ID, and
the device measures a timing event indicating a start of burst time relative to a start of a closest time-slot.

59. The method of claim 58, further comprising:
using transmission and reception times to determine a signal propagation time, including delays related to signal filtering operations performed at a transmitter and at a receiver.

60. The method of claim 1, wherein the derived information includes an indication of a duration for powering on one or more components of the device to receive the one or more blocks of data included in the burst.

61. The method of claim 60 wherein the powering on of the one or more components continues for a first duration of time based on the derived information.

* * * * *